United States Patent Office 3,527,810
Patented Sept. 8, 1970

3,527,810
PROCESS FOR PREPARING A DIMETHYL SULFOXIDE-SULFUR TRIOXIDE COMPLEX
David J. Pettitt, San Diego, Calif., assignor to Kelco Company, San Diego, Calif., a corporation of Delaware
No Drawing. Filed June 6, 1968, Ser. No. 734,853
Int. Cl. C07c *147/00;* C08b *5/14*
U.S. Cl. 260—607
4 Claims

ABSTRACT OF THE DISCLOSURE

Process for preparing a dimethyl sulfoxide-sulfur trioxide complex by reacting dimethyl sulfoxide with sulfur trioxide in the presence of tetrachloroethylene said complex being useful in preparing sulfate esters of cellulose or starch.

---

This invention relates to a method for preparing a dimethyl sulfoxide-sulfur trioxide complex.

A dimethyl sulfoxide-sulfur trioxide complex is useful in preparing sulfate esters of cellulose or starch. Preferably, the complex has the formula:

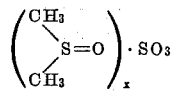

$$\left( \begin{array}{c} CH_3 \\ \diagdown \\ S=O \\ \diagup \\ CH_3 \end{array} \right)_x \cdot SO_3$$

where $x$ is a number, either a whole number or a fraction, ranging from 1 up to about 3. Preferably $x$ is equal to about 1 since the complex in this form contains the greatest amount of sulfur trioxide and is, therefore, more reactive in sulfating cellulose or starch.

In using a sulfur trioxide-dimethyl sulfoxide complex in sulfating cellulose or starch, the sulfation reaction is generally carried out in the presence of dimethyl sulfoxide as the reaction solvent. The cellulose or starch, which is preferably preswollen in dimethyl sulfoxide, is contacted with the dimethyl sulfoxide-sulfur trioxide complex. The dimethyl sulfoxide solvent can be employed in large excess in the reaction mixture in amounts ranging from 1 to 50 or more times the weight of the cellulose or starch reactant.

Any available form of cellulose may be employed in the sulfation reaction and the choice of a particular form of cellulose will, in general, be determined by the purity and nature of the product which is desired. Thus, for example, long fiber cotton or chemically treated cotton linters may be employed as a source of cellulose. Also, cellulose derived from wood may be employed and even ground wood itself can be used, particularly those varieties of wood which are relatively rich in cellulose and relatively poor in lignin and other constituents.

Likewise any form of starch may be employed, such as waxy maize starch, corn starch, potato starch, tapioca starch, or the like. The starch employed may be in either its natural occurring state or it may be pre-gelatinized.

The temperature of the sulfation reaction can be varied but preferably is kept at about room temperature, i.e., about 15° C. to about 25° C. The reaction time required for relatively complete esterification is in the order of ½ to several hours, depending, of course, upon the selected temperature and the relative concentrations of the reactants, including the diluent and the dimethyl sulfoxide-sulfur trioxide complex in the reaction mixture. Since the dimethyl sulfoxide-sulfur trioxide complex reacts preferentially with water, the cellulose or starch reactant should be kept dry to prevent consumption of the complex by reaction with water.

The sulfate esters of cellulose or starch obtained by the above process are half esters of sulfuric acid. Thus, one of the hydrogen ions of sulfuric acid is free to react to produce salts. The resulting sulfate esters of starch or cellulose may, therefore, be neutralized by reaction with a calculated amount of an alkali metal hydroxide, alkali metal carbonate, alkali metal bicarbonate, ammonium hydroxide, ammonium carbonate, or ammonium bicarbonate. Essentially, any base may be employed for neutralization of the sulfate ester products and the above listing is only intended to exemplify a few of the many bases which may be employed.

In conducting the above sulfation reaction, it has been found preferable to employ the solid dimethyl sulfoxide-sulfur trioxide complex as a reactant since the sulfur trioxide is more reactive in this form. When sulfur trioxide is added to excess dimethyl sulfoxide, the sulfur trioxide complex becomes less reactive as the complex stands in contact with dimethyl sulfoxide for prolonged periods of time, such as 24 hours. This problem is eliminated by employing the solid dimethyl sulfoxide-sulfur trioxide complex which is stable in storage at room temperature and retains its reactivity during prolonged storage.

By using the solid dimethyl sulfoxide-sulfur trioxide complex for reaction with preswollen cellulose or starch, a completely water-soluble product is usually obtained after 15 minutes at a reaction temperature of 15° C. without the need for using large quantities of dimethyl sulfoxide. In order to obtain a water-soluble cellulose sulfate, it has been found that the degree of sulfate substitution (D.S.) must be greater than 1.0.

The sulfate esters of cellulose or starch as obtained by the above process complex with and precipitate protein from 2% aqueous solutions of egg albumen or gelatin. The sulfate esters may be employed in thickening glues. Thus, for example, a glue prepared by adding 15 grams of bone glue to 105 cc.'s of water had a viscosity of 2.0 cps. at 45° C. and 12 cps. at 25° C. When the glue was prepared by adding 13.5 grams of bone glue and 1.5 grams of a sodium cellulose sulfate, prepared according to the above described process, to 105 cc.'s of water, the glue had a viscosity of 390 cps. at 45° C. and 950 cps. at 25° C.

The above described process for sulfating cellulose or starch does not form a part of my invention and is included in the present application only to demonstrate the utility of a dimethyl sulfoxide-sulfur trioxide complex. For a more complete description of the process for sulfating cellulose or starch through use of a dimethyl sulfoxide-sulfur trioxide complex, as well as a thorough discussion of the dimethyl sulfoxide-sulfur trioxide complex itself, reference is made to U.S. patent application Ser. No. 635,663 filed May 3, 1967 in the name of Roy L. Whistler, the disclosure of which is incorporated by reference.

A difficulty in using the above described sulfation process involves problems in preparing the dimethyl sulfoxide-sulfur trioxide complex. The reaction between liquid sulfur trioxide and dimethyl sulfoxide is very exothermic. Thus, to avoid overheating with consequent darkening and violent boiling of the reaction mixture, it was previously found necessary to add the sulfur trioxide slowly to well-stirred and efficiently cooled (lower than about 15° C.) dimethyl sulfoxide. Such a procedure is not satisfactory for producing the solid complex on a large scale, as required for use in a commercial sulfation process. Moreover, such a procedure is dangerous since, as reported in the literature, it is very hazardous to expose dimethyl sulfoxide to high temperatures and acidic conditions since the material is explosive under these conditions.

In forming a dimethyl sulfoxide-sulfur trioxide complex, the most desirable form of the complex, as stated above, is one in which the complex has the formula:

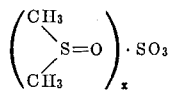

$$\left( \begin{array}{c} CH_3 \\ \diagdown \\ S=O \\ \diagup \\ CH_3 \end{array} \right)_x \cdot SO_3$$

in which $x$ ranges from 1 to about 3. The most preferred form of the complex is one in which $x$ is equal to about 1 since the complex in this form contains the maximum amount of sulfur trioxide and is, therefore, more reactive in sulfating cellulose or starch.

In order to prepare the complex in which $x$ is equal to about 1, it is necessary that the sulfur trioxide reactant be employed in an amount which is approximately stoichiometric with respect to the dimethyl sulfoxide. In many cases, it may be desirable to employ a light excess of sulfur trioxide in the reaction mixture in order to drive the reaction to completion. Sulfur trioxide is much cheaper than dimethyl sulfoxide. Thus, the reaction should be conducted in such a manner as to utilize all of the dimethyl sulfoxide in the formation of the dimethyl sulfoxide-sulfur trioxide complex.

Sulfur trioxide is quite reactive with many organic solvents. This is especially so when sulfur trioxide is present in excess quantities in the reaction mixture. Even in the case where sulfur trioxide is not employed in excess with respect to dimethyl sulfoxide, the high reactivity of sulfur trioxide can create considerable problems due to its undesired reaction with the solvent which can result in little or no formation of the desired dimethyl sulfoxide-sulfur trioxide complex.

I have discovered that tetrachloroethylene is uniquely suitable as a reaction solvent in the formation of a dimethyl sulfoxide-sulfur trioxide complex. Tetrachloroethylene is relatively cheap, easily recoverable from the reaction product and is relatively non-toxic. Moreover, tetrachloroethylene is surprisingly stable in the presence of dimethyl sulfoxide and sulfur trioxide and does not react with sulfur trioxide to form undesired by-products.

The use of tetrachloroethylene as a reaction solvent has been found to eliminate the problems which were previously encountered in the formation of a dimethyl sulfoxide-sulfur trioxide complex as a result of the exothermic nature of the reaction. The use of tetrachloroethylene as the reaction solvent has been found to provide efficient cooling during the addition of sulfur trioxide to the reaction mixture and thus greatly reduces any danger of an explosive exothermic reaction.

To further illustrate my invention, there are presented the following examples in which all parts and percentages are by weight unless otherwise indicated.

EXAMPLE 1

Two hundred and sixty milliliters (ml.) of dimethyl sulfoxide was suspended in 750 ml. of tetrachloroethylene and the mixture was cooled to 10° C. Liquid sulfur trioxide (125 ml.) was then added at 10–14° C. over a period of 1½ hours with efficient stirring. The white solid which formed during the reaction was collected by filtration under vacuum—taking care to protect the product from atmospheric moisture—and the solvent was pressed out using a rubber dam. Removal of the solvent was completed under vacuum in a desiccator. The white dimethyl sulfoxide-sulfur trioxide product weighed 466 g. (98% of theory).

EXAMPLE 2

Four hundred grams of a dimethyl sulfoxide-sulfur trioxide complex prepared as in Example 1 was mixed with 200 mls. of dimethyl sulfoxide to form a paste which was added in one portion to 80 grams of dried cotton linters which had been soaked overnight with 400 mls. of dimethyl sulfoxide. The temperature was maintained at 20–25° C. and stirring was continued for one and one-half hours after which a test sample was taken. The test sample dissolved in water to form a clear solution. The solubility of the test sample in water, which is a result of the high degree of sulfate substitution of the cellulose, demonstrated that the sulfation reaction was essentially complete.

The crude product was then dissolved in water at 5–10° C. and neutralized with 50% aqueous sodium hydroxide to a pH of 10. The product was then precipitated through the addition of methyl alcohol. The dried product had a D.S. of 1.2 and, after removing salt by dialysis, a 1% solution of the product in water was found to have a viscosity of 360 cps. as measured with a Brookfield, Model LVF Viscometer having a spindle speed of 60 r.p.m.

EXAMPLE 3

80 grams of dried cotton linters were soaked overnight in 510 mls. of dimethyl sulfoxide and then stirred for 4 hours in a Sigma Blade Mixer. To the mixture was added 447 grams of the dimethyl sulfoxide-sulfur trioxide complex (prepared in accord with Example 1), which had been slurried with 400 mls. of dimethyl sulfoxide. The slurry was added in one portion at 23° C. with stirring. The reaction mixture was stirred for 1 hour at 27–29° C. followed by stirring for 1¾ hours at 20–22° C. The resulting crude product was dissolved in 5 liters of water at a temperature of 10–15° C. and then neutralized by the addition of a 50% aqueous solution of sodium hydroxide. The resulting sodium cellulose sulfate was precipitated by the addition of methyl alcohol to the reaction mixture and after dialysis the resulting sodium cellulose sulfate product was found to have a D.S. (degree of sulfate substitution) of 1.9. A 1% aqueous solution of the dialyzed product was found to have a viscosity of 175 cps.

As demonstrated in Example 1 above, my process provides an efficient and safe method for formation of a dimethyl sulfoxide-sulfur trioxide complex on a relatively large scale. Unlike prior art procedures, the complex can be prepared relatively rapidly and any danger due to the exothermic reaction between dimethyl sulfoxide and sulfur triodixe is greatly reduced.

As shown by Examples 2 and 3, a dimethyl sulfoxide-sulfur trioxide complex prepared according to the method of my invention is quite reactive and satisfactorily forms sulfate esters of cellulose according to the process previously described. Likewise, the complex prepared by my process is suitable in sulfating starch.

In forming a dimethyl sulfoxide-sulfur trioxide complex according to my method, the tetrachloroethylene reaction solvent is employed in excess in the reaction mixture. In general, the quantity of tetrachloroethylene present in the reaction mixture should be at least about 3 times the volume of the dimethyl sulfoxide reactant which is present although larger volumes of tetrachloroethylene can, of course, be employed. The reaction temperature used for formation of the complex is generally maintained at about 20° C. or less and more preferably at about 15° C., or less. Inasmuch as water is reactive with the dimethyl sulfoxide-sulfur trioxide complex, water is excluded from the reaction vessel by any convenient means, such as, for example, by using a blanketing atmosphere of a dry inert gas, such as nitrogen.

As the sulfur trioxide is added to the mixture of dimethyl sulfoxide and tetrachloroethylene, in the performance of my process, the reaction mixture is agitated. Agitation assists in the removal of heat which results from the exothermic reaction between dimethyl sulfoxide and sulfur trioxide. The solid reaction complex which forms is readily separated from the reaction system by filtering or any other suitable means. During the recovery operation, care must be taken to shield the complex from atmospheric moisture which will react with the complex.

The surprising nature of my process is demonstrated by a number of experimental test runs in which various chlorinated hydrocarbon solvents were found to be completely unsuitable for use as a reaction solvent in my process. Methylene chloride was found unsatisfactory since it resulted in a product which was not the desired dimethyl sulfoxide-sulfur trioxide complex but rather a material which was unstable, fumed in air and decomposed on standing. Similarly, an attempt to use ethylene dichloride as a reaction solvent was unsatisfactory since it also resulted in a material which was not the desired product and which decomposed in air.

The use of trichlorofluoromethane was also attempted as a reaction solvent in my process. Use of this material as a reaction solvent gave a dark brown mass which foamed on exposure to air and which reacted violently on addition to water.

It was found that carbon tetrachloride could be employed as a solvent for reaction of dimethyl sulfoxide with sulfur trioxide. However, this material was not satisfactory in that an excess of sulfur trioxide in the reaction mixture resulted in a reaction with the carbon tetrachloride solvent to produce undesirable by-products. Also, carbon tetrachloride is quite toxic and is undesirable as a reaction solvent for reasons of safety.

As illustrated by the foregoing specification and examples, my invention provides an economical and safe method for preparing a dimethyl sulfoxide-sulfur trioxide complex by utilizing tetrachloroethylene as a reaction solvent. The tetrachloroethylene solvent provides efficient cooling of the reaction mixture to dissipate the heat of reaction and also, because of its unique properties, eliminates undesired side reactions to produce the desired dimethyl sulfoxide-sulfur trioxide product in high yield.

Having fully described my invention in the foregoing specification, I desire to be limited only by the lawful scope of the appended claims:

I claim:
1. A method for preparing a dimethyl sulfoxide-sulfur trioxide complex having the formula:

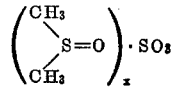

wherein $x$ is a number ranging from 1 to about 3, said process comprising reacting dimethyl sulfoxide with sulfur trioxide in the molar ratio of about 1 to about 3 moles of dimethyl sulfoxide per mole of sulfur trioxide, said reaction being carried out at a reaction temperature of about 20° C. or less with agitation in the presence of tetrachloroethylene as the reaction solvent, said solvent being present in an amount of at least about three times the volume of said dimethyl sulfoxide reactant, and said reaction being conducted in the essential absence of water.

2. The method of claim 1, wherein said reaction is carried out at a reaction temperature of about 15° C. or less.

3. The method of claim 1, wherein said dimethyl sulfoxide-sulfur trioxide complex has the formula:

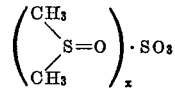

wherein $x$ is equal to about 1, and said dimethyl sulfoxide reactant is employed in an amount which is about stoichiometric with respect to said sulfur trioxide reactant.

4. The method of claim 2, wherein said dimethyl sulfoxide-sulfur trioxide complex has the formula:

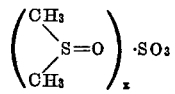

wherein $x$ is equal to about 1, and said dimethyl sulfoxide reactant is employed in an amount which is about stoichiometric with respect to said sulfur trioxide reactant.

References Cited

Smedslund, Chemical Abstract, vol. 46, page 4329, (1952).

CHARLES B. PARKER, Primary Examiner

D. R. PHILLIPS, Assistant Examiner

U.S. Cl. X.R.

260—215, 234